(12) United States Patent
Huang

(10) Patent No.: US 10,382,733 B2
(45) Date of Patent: Aug. 13, 2019

(54) IMAGE PROCESSING DEVICE AND METHOD THEREOF

(71) Applicant: REALTEK SEMICONDUCTOR CORP., Hsinchu (TW)

(72) Inventor: Wen-Tsung Huang, Chiayi (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 61 days.

(21) Appl. No.: 15/893,751

(22) Filed: Feb. 12, 2018

(65) Prior Publication Data

US 2018/0270461 A1 Sep. 20, 2018

(30) Foreign Application Priority Data

Mar. 17, 2017 (TW) .............................. 106108950 A

(51) Int. Cl.
| | | |
|---|---|---|
| H04N 9/04 | (2006.01) | |
| H04N 9/64 | (2006.01) | |
| H04N 5/33 | (2006.01) | |

(52) U.S. Cl.
CPC .............. *H04N 9/646* (2013.01); *H04N 5/332* (2013.01); *H04N 9/04553* (2018.08)

(58) Field of Classification Search
CPC ..... H04N 9/646; H04N 9/04553; H04N 5/332
See application file for complete search history.

(56) References Cited

U.S. PATENT DOCUMENTS

| | | | |
|---|---|---|---|
| 9,344,689 B2 | 5/2016 | Choi et al. | |
| 2008/0203305 A1 | 8/2008 | Suzuki et al. | |
| 2010/0289885 A1 | 11/2010 | Lu et al. | |
| 2012/0281081 A1* | 11/2012 | Atif ................... | G02B 27/0075 348/79 |
| 2015/0062347 A1 | 3/2015 | Jin | |
| 2015/0237270 A1* | 8/2015 | Atif ........................ | H04N 5/332 348/164 |
| 2016/0223819 A1* | 8/2016 | Liu ..................... | G02B 27/0172 |
| 2017/0205886 A1* | 7/2017 | Wan ........................ | G06F 3/011 |
| 2017/0374299 A1* | 12/2017 | Liu ........................ | H04N 5/332 |

FOREIGN PATENT DOCUMENTS

CN 104350744 A 2/2015

\* cited by examiner

*Primary Examiner* — Howard D Brown, Jr.
(74) *Attorney, Agent, or Firm* — Li & Cai Intellectual Property (USA) Office

(57) ABSTRACT

An image processing method, applied to a device including a sensor and a processor connected to the sensor, the sensor including a plurality of pixels, in which each of the pixels senses three primary colors and an infrared ray of an image, the processor executing the method including: calculating a real response value of the infrared ray without a crosstalk interference from the three primary colors according to the crosstalk interference from the three primary colors to the infrared ray; calculating real response values of the three primary colors without a crosstalk interference from the infrared ray according to the crosstalk interference of the real response value from the infrared ray to the three primary colors; and increasing a brightness of the image according to a brightness of the real response value of the infrared ray and the real response values of the three primary colors.

20 Claims, 4 Drawing Sheets

IMAGE PROCESSING DEVICE AND METHOD THEREOF

BACKGROUND

1. Technical Field

The present disclosure relates to an image processing, in particular, to an image processing device and method thereof related to an infrared ray.

2. Description of Related Art

A traditional three-color (RGB) sensor has a low sensitivity in a low light source environment. In general, an image capture device having a level of monitoring application uses an infrared (IR) cutoff filter to output an RGB color image in daylight mode and turn on an infrared active light source unperceivable by the human eye in night mode to output an IR image having sufficient brightness. However, the mechanical IR cutoff filter is susceptible to damage due to excessive use, and the volume and cost thereof are also relatively increased. In recent years, as IR imaging is gradually applied to face recognition, pupil identification, and depth identification, people have turned to the new hybrid RGBIr sensor to accommodate the need for adding IR image features in limited institutional space.

Since the IR cutoff filter is no longer used, IR pixels in the hybrid RGBIr filter array are used to absorb light when an IR component is present in ambient light. However, an overlapping situation often occurs in the R/G/B/IR spectrum itself. The sensor manufacturing technology does not completely block absorption from non-color signals, so that when the light energy is with a high IR component, the object color will be affected by the IR crosstalk interference to cause a color washout phenomenon which results in color shift.

SUMMARY

An image processing device and method thereof of the instant disclosure can reduce an effect of the IR crosstalk interference in a RGB color image, and also improve a color washout phenomenon of a color shift in the RGB color image.

An exemplary embodiment of the instant disclosure provides an image processing device, including: a sensor including a plurality of pixels, each of the pixels sensing three primary colors and an infrared ray of an image; and a processor connected to the sensor. The processor calculates first crosstalk response values of the infrared ray corresponding to the three primary colors, respectively, according to parameters of degree of crosstalk interference from the respective primary colors to the infrared ray; the processor calculates a second crosstalk response value of the infrared ray according to the first crosstalk response values corresponding to the three primary colors and crosstalk interference proportions of the three primary colors to the infrared ray; and the processor subtracts an interference response value from the second crosstalk response value to obtain a real response value of the infrared ray without a crosstalk interference from the three primary colors.

An exemplary embodiment of the instant disclosure provides an image processing device, including: a sensor including a plurality of pixels, each of the pixels sensing three primary colors and an infrared ray of an image; and a processor connected to the sensor. The processor calculates a first crosstalk response value of a primary color according to a distance response value of a real response value of the infrared ray corresponding to the primary color; the processor calculates a mapping proportion of the primary color according to an image bit length of the image and the distance response value corresponding to the primary color; and the processor obtains a real response value of the primary color without a crosstalk interference from the infrared ray according to the first crosstalk response value and the mapping proportion of the primary color.

An exemplary embodiment of the instant disclosure provides an image processing method, applied to a device including a sensor and a processor connected to the sensor, the sensor including a plurality of pixels, each of the pixels sensing three primary colors and an infrared ray of an image, the processor executing the method including: calculating a real response value of the infrared ray without a crosstalk interference from the three primary colors according to the crosstalk interference from the three primary colors to the infrared ray; calculating real response values of the three primary colors without a crosstalk interference from the infrared ray according to the crosstalk interference from the real response value of the infrared ray to the three primary colors; and increasing a brightness of the image according to a brightness of the real response value of the infrared ray and the real response values of the three primary colors.

The image processing device and method thereof of the instant disclosure can correct an angular shift of lens to compensate a color deviation, eliminate hardware dark current effects to accurately restore a color performance, compensate a dynamic range of the response values of the RGB color to reduce a color shift phenomenon, and increase a brightness of the RGB color image via an IR active light source in a low light source environment.

For further understanding of the instant disclosure, reference is made to the following detailed description illustrating the embodiments of the instant disclosure. The description is only for illustrating the instant disclosure, not for limiting the scope of the claims.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only to distinguish one element, component, region, layer, or section from another element, component, region, layer, or section discussed below. Thus, a first element, component, region, layer, or section discussed below could be termed a second element, component, region, layer, or section without departing from the teachings of the instant disclosure. As used herein, the term "and/or" includes any and all combinations of one or more of the associated listed items.

Figure 1:
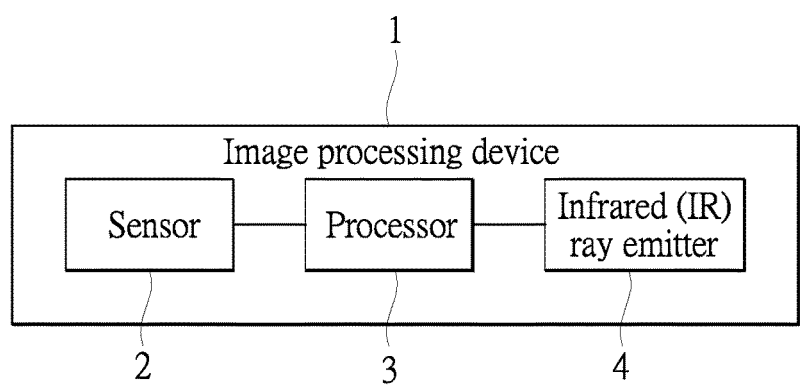
FIG. 1 is a block diagram of an image processing device according to an embodiment of the instant disclosure.

FIG. 1 is a block diagram of an image processing device according to an embodiment of the instant disclosure. The image processing device 1 of the instant disclosure includes a sensor 2, a processor 3 and an infrared (IR) ray emitter 4. The processor 3 is connected to the sensor 2 and the infrared ray emitter 4. The sensor 2 includes a plurality of pixels and senses an image. Each of the pixels senses three primary colors RGB and an infrared ray of the image. The pixels can be arranged in an array or arbitrary arrangement, but the instant disclosure is not limited thereto. The processor 3 executes an image processing method. The infrared ray emitter 4 emits an IR active light source.

Figure 2:
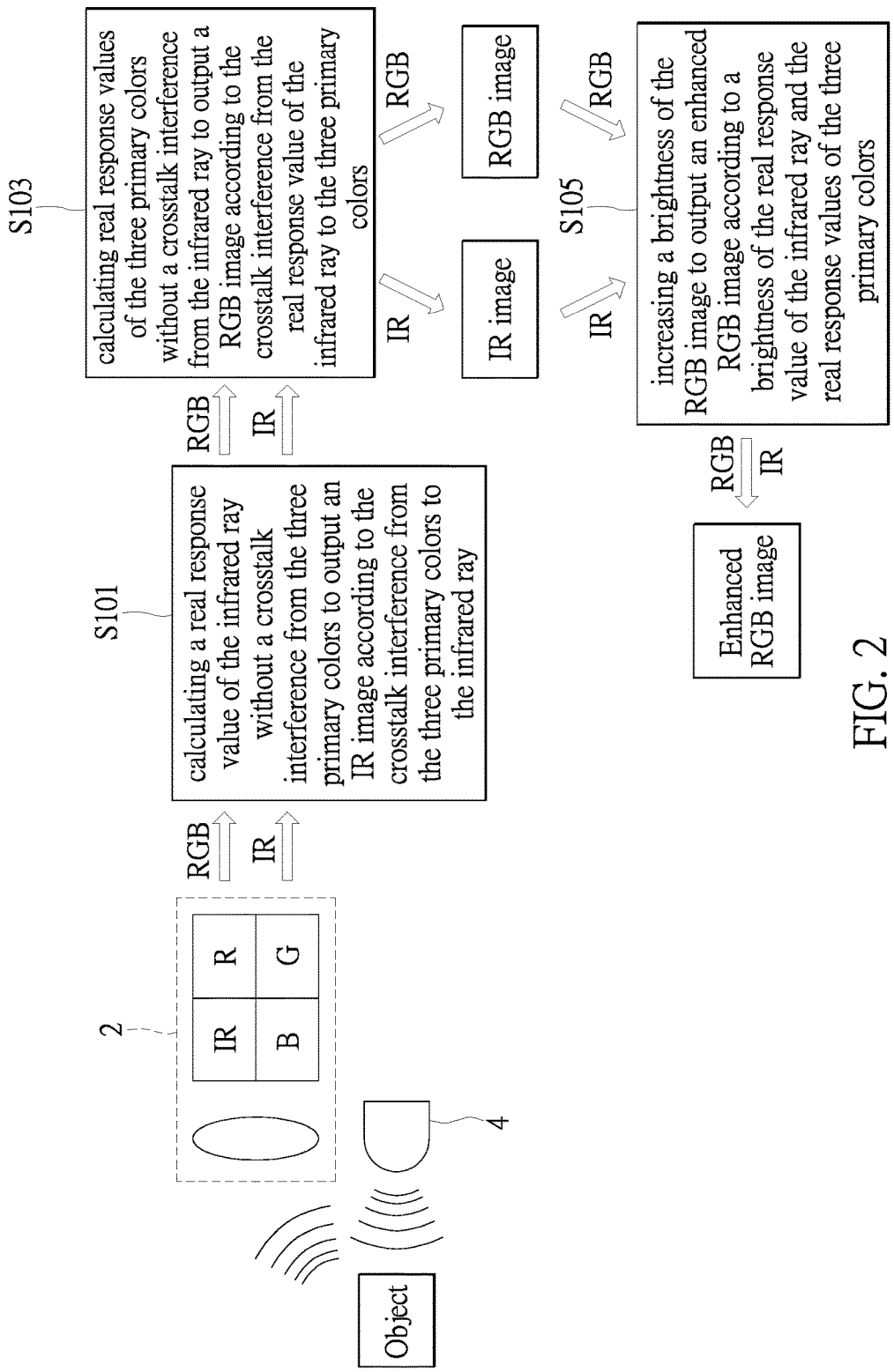
FIG. 2 is a flow chart of an image processing method according to an embodiment of the instant disclosure.

FIG. 2 is a flow chart of an image processing method according to an embodiment of the instant disclosure. When the ambient light source is sufficient, the sensor 2 senses the three primary colors RGB and the infrared IR ray of the image so that the processor 3 executes an image processing method. When the ambient light source is insufficient, the infrared ray emitter 4 emits the IR active ray source so that an object can reflect the infrared ray and the sensor 2 senses the three primary colors and the infrared ray of the image, such that the processor 3 executes the image processing method. The processor 3 executes the image processing method including the steps of: S101: calculating a real response value of the infrared ray without a crosstalk interference from the three primary colors to output an IR image according to the crosstalk interference from the three primary colors to the infrared ray; S103: calculating real response values of the three primary colors without a crosstalk interference from the infrared ray to output a RGB image according to the crosstalk interference from the real response value of the infrared ray to the three primary colors; and S105: increasing a brightness of the RGB image to output an enhanced RGB image according to a brightness of the real response value of the infrared ray and the real response values of the three primary colors.

Figure 3:
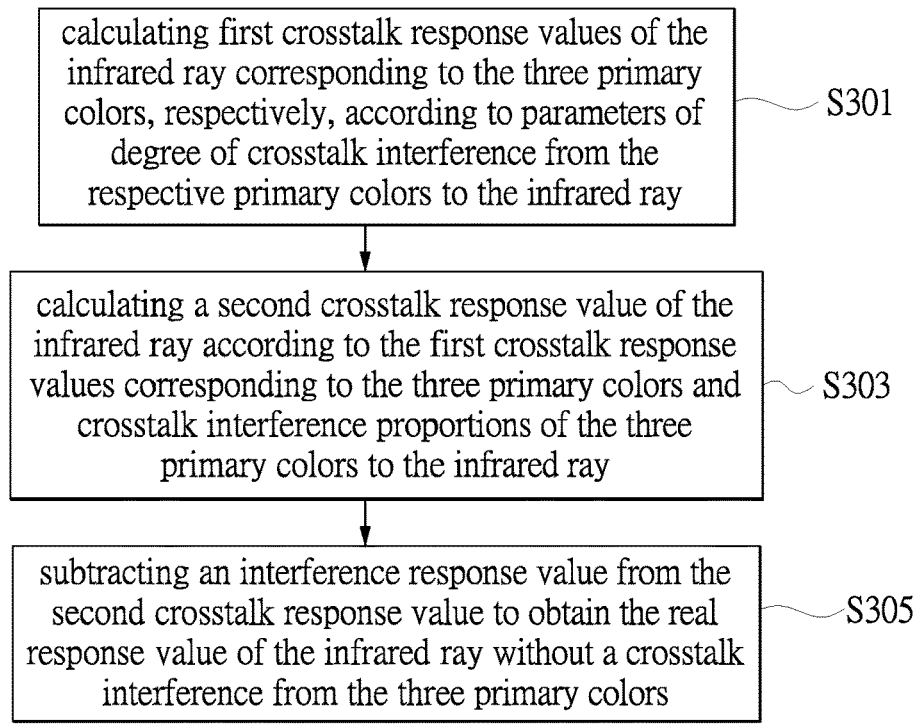
FIG. 3 is a flow chart of an image processing method according to another embodiment of the instant disclosure.

FIG. 3 is a flow chart of an image processing method according to another embodiment of the instant disclosure. In step S101, the processor 3 calculating the real response value of the infrared ray without the crosstalk interference from the three primary colors according to the crosstalk interference from the three primary colors to the infrared ray includes the steps of: S301: calculating first crosstalk response values of the infrared ray corresponding to the three primary colors, respectively, according to parameters of degree of crosstalk interference from the respective primary colors to the infrared ray; S303: calculating a second crosstalk response value of the infrared ray according to the first crosstalk response values corresponding to the three primary colors and crosstalk interference proportions of the three primary colors to the infrared ray; and S305: subtracting an interference response value from the second crosstalk response value to obtain the real response value of the infrared ray without a crosstalk interference from the three primary colors.

The equations for calculating the real response value of the infrared ray without the crosstalk interference from the three primary colors used by the processor 3 is shown below.

$$IR_{crosstalk\_R} = IR_{ori} - \alpha_1 R_{ori}$$

$$IR_{crosstalk\_G} = IR_{ori} - \alpha_2 G_{ori}$$

$$IR_{crosstalk\_B} = IR_{ori} - \alpha_3 B_{ori}$$

$$IR_{crosstalk\_RGB} = \beta_1 IR_{crosstalk\_R} + \beta_2 IR_{crosstalk\_G} + \beta_3 IR_{crosstalk\_B}$$

$$IR_{output} = IR_{crosstalk\_RGB} - IR_{offset}$$

Where, the crosstalk interference level parameter $\alpha_i$ is a proportion parameter set up by a user according to absorption spectral characteristics of the sensor 2. The crosstalk interference level parameter $\alpha_i$ of each of the three primary colors is different, where i=1~3. The crosstalk interference proportion $\beta_i$ is the proportion of the infrared ray which is affected by the three primary colors, respectively. The crosstalk interference proportion $\beta_i$ of each of the three primary colors is different, where i=1~3. $IR_{ori}$ is an original response value of the infrared ray. $\alpha_1 R_{ori}$ is a product of the parameter $\alpha_1$ of degree of crosstalk interference of the primary color R with an original response value $R_{ori}$ of the primary color R. $IR_{crosstalk\_R}$ is the first crosstalk response value of the infrared ray obtained by subtracting the product $\alpha_1 R_{ori}$ from the original response value $IR_{ori}$ of the infrared ray. $\alpha_2 G_{ori}$ is a product of the parameter $\alpha_2$ of degree of crosstalk interference of the primary color G with an original response value $G_{ori}$ of the primary color G. $IR_{crosstalk\_G}$ is the first crosstalk response value of the infrared ray obtained by subtracting the product $\alpha_2 G_{ori}$ from the original response value $IR_{ori}$ of the infrared ray. $\alpha_3 B_{ori}$ is a product of the parameter $\alpha_3$ of degree of crosstalk interference of the primary color B with an original response value $B_{ori}$ of the primary color B. $IR_{crosstalk\_B}$ is the first crosstalk response value of the infrared ray obtained by subtracting the product $\alpha_3 B_{ori}$ from the original response value $IR_{ori}$ of the infrared ray. $\beta_1 IR_{crosstalk\_R}$ is a product of the first crosstalk response value $IR_{crosstalk\_R}$ of the infrared ray corresponding to the primary color R and a crosstalk interference proportion $\beta_1$ of the primary color R. $\beta_2 IR_{crosstalk\_G}$ is a product of the first crosstalk response value $IR_{crosstalk\_G}$ of the infrared ray corresponding to the primary color G and a crosstalk interference proportions $\beta_2$ of the primary color G. $\beta_3 IR_{crosstalk\_B}$ is a product of the first crosstalk response value $IR_{crosstalk\_B}$ of the infrared ray corresponding to the primary color B and a crosstalk interference proportions $\beta_3$ of the primary color B. $IR_{crosstalk\_RGB}$ is the second crosstalk response value of the infrared ray obtained by summing products corresponding to the three primary colors. $IR_{offset}$ is an interference response value of a dark current. $IR_{output}$ is the real response value of the infrared ray.

The step S101 can find the real response value $IR_{output}$ of the infrared ray without the crosstalk interference from the three primary colors and hardware effect. When the infrared ray emitter 4 is turned off and the sensor 2 senses the image without the infrared ray from the infrared ray emitter 4, it finds the deviation of the hardware effect by assuming that the ambient light source does not have the infrared ray, and that a response value of the infrared ray sensed by the sensor 2 should be 0. However, some values should still be present in the response value of the infrared ray, such as non-zero values. This indicates that the deviation is generated by the hardware. For example, the sensor 2 generates the interference response value $IR_{offset}$. The interference response value is not limited to being generated by the sensor 2 and can be generated by other hardware, but the instant disclosure is not limited thereto. The step S101 not only reduces the crosstalk interference of the three primary colors, but also eliminates the deviation of the hardware effect.

Figure 4:
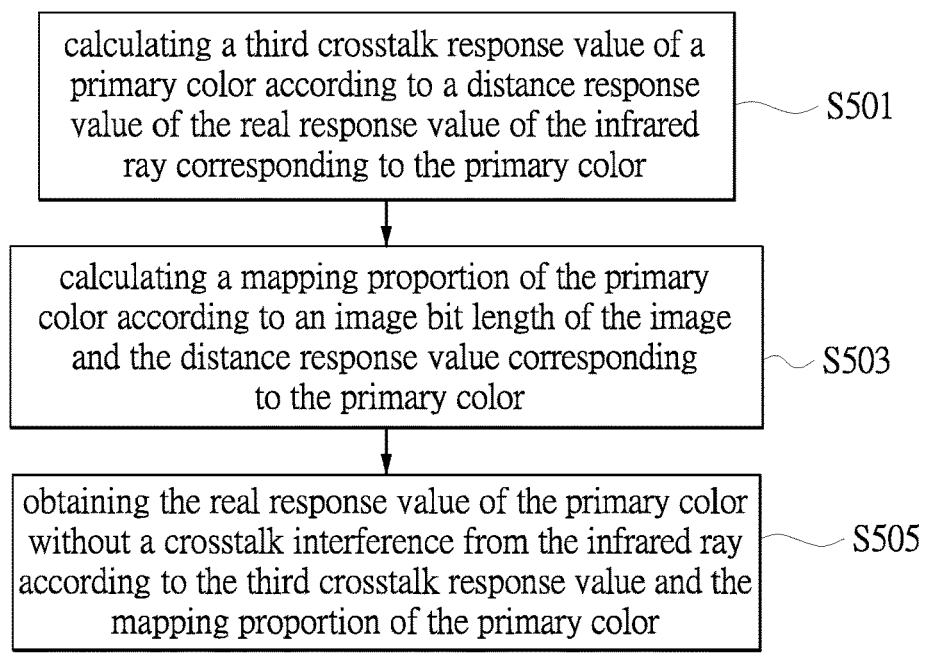
FIG. 4 is a flow chart of an image processing method according to yet another embodiment of the instant disclosure.

FIG. 4 is a flow chart of an image processing method according to another embodiment of the instant disclosure. In step S103, the processor 3 calculating the real response values of the three primary colors without the crosstalk interference from the infrared ray according to the crosstalk interference from the real response value of the infrared ray to the three primary colors includes: S501: calculating a third crosstalk response value of a primary color according to a distance response value of the real response value of the infrared ray corresponding to the primary color; S503: calculating a mapping proportion of the primary color according to an image bit length of the image and the distance response value corresponding to the primary color; and S505: obtaining the real response value of the primary color without a crosstalk interference from the infrared ray according to the third crosstalk response value and the mapping proportion of the primary color.

The equation for calculating the real response values of the three primary colors without the crosstalk interference from the infrared ray used by the processor 3 takes the primary color R as an example as shown below.

$$\gamma_{loc\_R} = f\_distance(\gamma_R)$$

$$R_{output} = (R_{ori} - \gamma_{loc\_R} IR_{output}) * N/(((N-1) - \gamma_{loc\_R} IR_{output}) + 1)$$

Where, $\gamma_R$ is an spectrum characteristic response parameter of the primary color R in the sensor 2. $\gamma_{loc\_R}$ is the distance response parameter of the primary color R. f_distance(x) is a linear equation of the distance response parameter for the sensor 2 indicating that spectrum characteristic response parameter of the primary color R increases along with a distance between the current pixel and a center of the image. The distance response parameter of each of the three primary colors is different. $R_{ori}$ is the original response value of the primary color R. $IR_{output}$ is the real response value of the infrared ray. $\gamma_{loc\_R} IR_{output}$ is a product of the real response value $IR_{output}$ of the infrared ray with the distance response value corresponding to the primary color R. $(R_{ori} - \gamma_{loc\_R} IR_{output})$ is the third crosstalk response value of the primary color R obtained by subtracting the product $\gamma_{loc\_R} IR_{output}$ from the original response value $R_{ori}$ of the primary color R. N is an image bit length of the image, that is, $N=2^j$, j is a number of bits. $(((N-1) - \gamma_{loc\_R} IR_{output}) + 1)$ is a difference value between the image bit length N and the product $\gamma_{loc\_R} IR_{output}$. $N/(((N-1) - \gamma_{loc\_R} IR_{output}) + 1)$ is a mapping proportion obtained by dividing the image bit length N by the difference value. $R_{output}$ is the real response value of the primary color R obtained by multiplying the third crosstalk response value of the primary color R by the mapping proportion.

In addition, the way which obtains the real response values of the primary colors G, B is similar to that which obtains the primary color R, and hence is not reiterated herein. Therefore, the image processing device 1 can respectively obtain the real response values of the three primary colors RGB by the equations of the three primary colors RGB.

The step S103 can adjust a dynamic range of the response values of the three primary colors RGB affected by the infrared ray, find the real response values of the three primary colors RGB without the crosstalk interference from the infrared ray, and fix a color shift of the image. Assuming j=8, then $N=2^8=256$; that is, an ideal dynamic range of the response values of the three primary colors RGB is 0~255. When a dynamic range of the response value is affected by the infrared ray, the dynamic range of the response value of the primary color is 0~k, k<255; that is, the dynamic range of the response value of the primary color is changed by the effect of the infrared ray. Therefore, the dynamic range of the response values of the three primary colors RGB is adjusted by the step S103 to approximate the ideal dynamic range of the response values of the three primary colors RGB. In addition, due to the physical characteristics (an angular shift) of the lens, the infrared ray gradually affecting the three primary colors RGB from the center to the edge of the image generates an offset. Therefore, the response values of the three primary colors RGB are linearly compensated along with the gradual increase of a distance between the center of the image and any pixels on the image in the step S103, so that a color deviation and a color washout phenomenon caused by the infrared ray gradually affecting from the center to the edge of the image can be improved.

Figure 5:
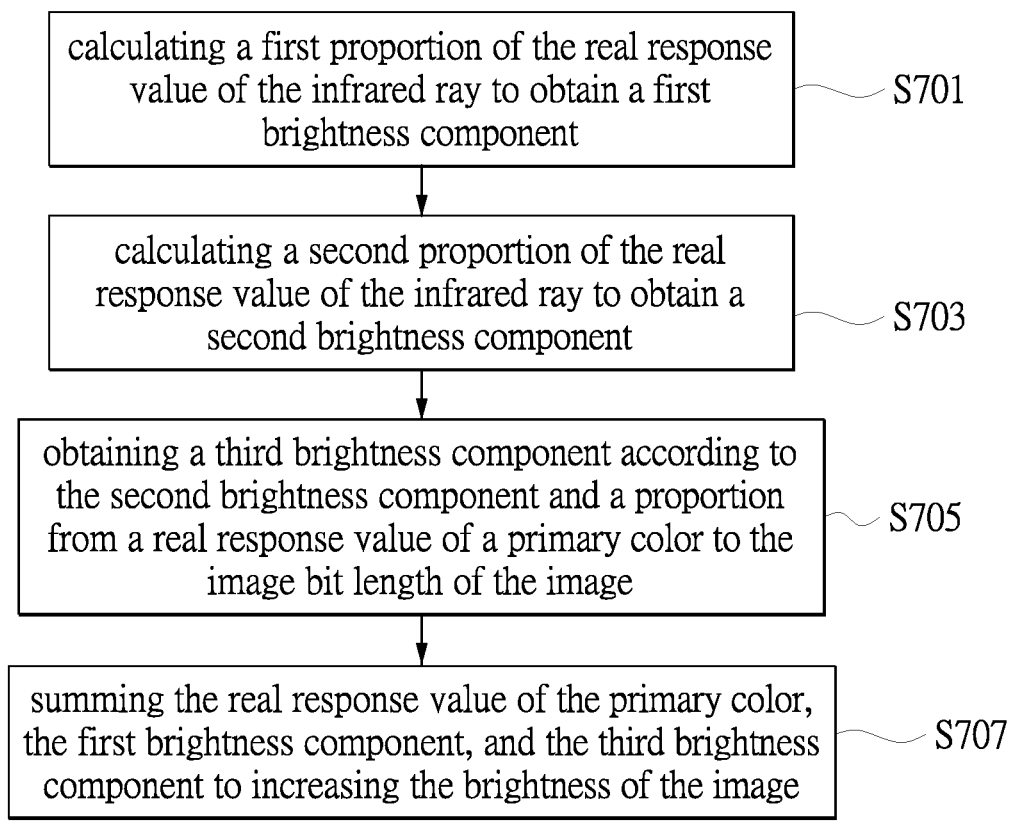
FIG. 5 is a flow chart of an image processing method according to yet another embodiment of the instant disclosure.

FIG. 5 is a flow chart of an image processing method according to another embodiment of the instant disclosure. In step S105, the processor 3 increasing the brightness of the image according to the brightness of the real response value of the infrared ray and the real response values of the three primary colors RGB includes the steps of: S701: calculating a first proportion of the real response value of the infrared ray to obtain a first brightness component; S703: calculating a second proportion of the real response value of the infrared ray to obtain a second brightness component; S705: obtaining a third brightness component according to the second brightness component and a proportion from a real response value of a primary color to the image bit length of the image; and S707: summing the real response value of the primary color, the first brightness component, and the third brightness component to increasing the brightness of the image.

The equation for increasing the brightness of the image used by the processor 3 takes the primary color R as an example as shown below.

$$R_{enhanced\_output} = R_{output} + IR_{output} * (X-\delta)/X + IR_{output} * (R_{output}/(N-1)) * (\delta/X)$$

Where, X is a mixed accurateness parameter. $\delta$ is a mix proportion parameter. The mix accurateness parameter X is larger than 0. The mix proportion parameter $\delta$ is smaller than the mix accurateness parameter X. $(X-\delta)$ is a difference value between the mix accurateness parameter X and the mix proportion parameter $\delta$. $(X-\delta)/X$ is the first proportion obtained by dividing the difference value $(X-\delta)$ by the mix accurateness parameter X. $(\delta/X)$ is the second proportion obtained by dividing the mix proportion parameter $\delta$ by the mix accurateness parameter X. $(R_{output}/(N-1))$ is the real response value of the primary color R divided by the image bit length of the image. $IR_{output} * (X-\delta)/X$ is the first brightness component. $IR_{output} * (\delta/X)$ is the second brightness component. $IR_{output} * (R_{output}/(N-1)) * (\delta/X)$ is the third brightness component. $R_{enhanced\_output}$ is the brightness of the primary color R in the image enhanced by summing the real response value $R_{output}$ of the primary color R, the first brightness component $IR_{output} * (X-\delta)/X$, and the third brightness component $IR_{output} * (R_{output}/(N-1)) * (\delta/X)$.

In addition, the way which increases the brightness of the primary colors G, B in the image is similar to that which increases the primary color R, and hence is not reiterated herein. Therefore, the image processing device 1 can increase the brightness of the image by the equations of the three primary colors RGB.

The step S105 can provide brightness via the IR active light source in the low light source environment, so that the real response values of the three primary colors RGB are added by a part of the brightness of the real response value of the infrared ray to increase the brightness of the RGB color image.

Based on the above-mentioned, The image processing device and method thereof of the instant disclosure is capable of fixing an angular shift of lens to compensate the color deviation, eliminating hardware dark current effects to accurately restore color performance, compensating the dynamic range of the response value of the RGB color to reduce the color shift phenomenon, and increasing the brightness of the RGB color image via the IR active light source in low light source environment.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An image processing device, comprising:
a sensor including a plurality of pixels, each of the pixels sensing three primary colors and an infrared ray of an image; and
a processor connected to the sensor, the processor calculating first crosstalk response values of the infrared ray corresponding to the three primary colors, respectively, according to parameters of degree of crosstalk interference from the respective primary colors to the infrared ray, the processor calculating a second crosstalk response value of the infrared ray according to the first crosstalk response values corresponding to the three primary colors and crosstalk interference proportions of the three primary colors to the infrared ray, and the processor subtracting an interference response value from the second crosstalk response value to obtain a real response value of the infrared ray without a crosstalk interference from the three primary colors.

2. The device according to claim 1, wherein for each one of the three primary colors, the processor calculates a product of the parameter of degree of crosstalk interference and an original response value of the primary color, and the processor subtracts the product from an original response value of the infrared ray to obtain the first crosstalk response value of the infrared ray.

3. The device according to claim 1, wherein for each one of the three primary colors, the processor calculates a product of the first crosstalk response value of the infrared ray corresponding to the primary color and the crosstalk interference proportion of the primary color, and the processor sums the products corresponding to the three primary colors to obtain the second crosstalk response value of the infrared ray.

4. The device according to claim 1, further comprising:
an infrared ray emitter connected to the processor;
wherein the interference response value is generated by the sensor when the infrared ray emitter is turned off and the sensor does not sense any infrared ray from the emitter.

5. An image processing device, comprising:
a sensor including a plurality of pixels, each of the pixels sensing three primary colors and an infrared ray of an image; and
a processor connected to the sensor, the processor calculating a first crosstalk response value of a primary color according to a distance response value of a real response value of the infrared ray corresponding to the primary color, the processor calculating a mapping proportion of the primary color according to an image bit length of the image and the distance response value corresponding to the primary color, and the processor obtaining a real response value of the primary color without a crosstalk interference from the infrared ray according to the first crosstalk response value and the mapping proportion of the primary color.

6. The device according to claim 5, wherein the processor calculates a product of the real response value of the infrared ray and the distance response value corresponding to the primary color, and the processor subtracts the product from a real response value of the primary color to obtain the first crosstalk response value of the primary color.

7. The device according to claim 6, wherein the processor calculates a difference value between the image bit length and the product, and the processor divides the image bit length by the difference value to obtain the mapping proportion.

8. The device according to claim 5, wherein the processor multiplies the first crosstalk response value of the primary color by the mapping proportion to obtain the real response value of the primary color.

9. An image processing method, applied to a device including a sensor and a processor connected to the sensor, the sensor including a plurality of pixels, each of the pixels sensing three primary colors and an infrared ray of an image, the processor executing the method comprising:
calculating a real response value of the infrared ray without a crosstalk interference from the three primary colors according to the crosstalk interference from the three primary colors to the infrared ray;
calculating real response values of the three primary colors without a crosstalk interference from the infrared ray according to the crosstalk interference from the real response value of the infrared ray to the three primary colors; and
increasing a brightness of the image according to a brightness of the real response value of the infrared ray and the real response values of the three primary colors.

10. The method according to claim 9, wherein the step of calculating the real response value of the infrared ray without the crosstalk interference from the three primary colors according to the crosstalk interference from the three primary colors to the infrared ray includes:
calculating first crosstalk response values of the infrared ray corresponding to the three primary colors, respectively, according to parameters of degree of crosstalk interference from the respective primary colors to the infrared ray;
calculating a second crosstalk response value of the infrared ray according to the first crosstalk response values corresponding to the three primary colors and crosstalk interference proportions of the three primary colors to the infrared ray; and
subtracting an interference response value from the second crosstalk response value to obtain the real response value of the infrared ray without a crosstalk interference from the three primary colors.

11. The method according to claim 10, wherein for each one of the three primary colors, the processor calculates a product of the parameter of degree of crosstalk interference and an original response value of the primary color, and the processor subtracts the product from an original response value of the infrared ray to obtain the first crosstalk response value of the infrared ray.

12. The method according to claim 10, wherein for each one of the three primary colors, the processor calculates a product of the first crosstalk response value of the infrared ray corresponding to the primary color and the crosstalk interference proportion of the primary color, and the processor sums products corresponding to the three primary colors to obtain the second crosstalk response value of the infrared ray.

13. The method according to claim 10, wherein the device further includes:
an infrared ray emitter connected to the processor;
wherein the interference response value is generated by the sensor when the infrared ray emitter is turned off and the sensor does not sense any infrared ray from the emitter.

14. The method according to claim 9, wherein the step of calculating real response values of the three primary colors without the crosstalk interference from the infrared ray according to the crosstalk interference from the real response value of the infrared ray to the three primary colors includes:
calculating a third crosstalk response value of a primary color according to a distance response value of the real response value of the infrared ray corresponding to the primary color;
calculating a mapping proportion of the primary color according to an image bit length of the image and the distance response value corresponding to the primary color; and
obtaining the real response value of the primary color without a crosstalk interference from the infrared ray according to the third crosstalk response value and the mapping proportion of the primary color.

15. The method according to claim 14, wherein the processor calculates a product of the real response value of the infrared ray and the distance response value corresponding to the primary color, and the processor subtracts the product from a real response value of the primary color to obtain the third crosstalk response value of the primary color.

16. The method according to claim 15, wherein the processor calculates a difference value between the image bit length and the product, and the processor divides the image bit length by the difference value to obtain the mapping proportion.

17. The method according to claim 14, wherein the processor multiplies the third crosstalk response value of the primary color by the mapping proportion to obtain the real response value of the primary color.

18. The method according to claim 9, wherein the step of increasing the brightness of the image according to the brightness of the real response value of the infrared ray and the real response values of the three primary colors includes:
calculating a first proportion of the real response value of the infrared ray to obtain a first brightness component;
calculating a second proportion of the real response value of the infrared ray to obtain a second brightness component;
obtaining a third brightness component according to the second brightness component and a proportion from a real response value of a primary color to an image bit length of the image; and
summing the real response value of the primary color, the first brightness component, and the third brightness component to increase the brightness of the image.

19. The method according to claim 18, wherein the processor calculates a difference value between a mix accurateness parameter and a mix proportion parameter, the processor divides the difference value by the mix accurateness parameter to obtain the first proportion, and the processor divides the mix proportion parameter by the mix accurateness parameter to obtain the second proportion.

20. The method according to claim 18, wherein the processor divides the real response value of the primary color by the image bit length of the image and then multiplies the result thereof by the second brightness component to obtain the third brightness component.

* * * * *